United States Patent
Sarlioglu et al.

(10) Patent No.: US 9,917,543 B1
(45) Date of Patent: Mar. 13, 2018

(54) INVERTER FOR COMMON MODE VOLTAGE CANCELLATION

(71) Applicant: Wisconsin Alumni Research Foundation, Madison, WI (US)

(72) Inventors: Bulent Sarlioglu, Madison, WI (US); Di Han, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 15/297,988

(22) Filed: Oct. 19, 2016

(51) Int. Cl.
*H02P 27/08* (2006.01)
*H02P 6/16* (2016.01)
*H02M 7/5387* (2007.01)

(52) U.S. Cl.
CPC ........ *H02P 27/08* (2013.01); *H02M 7/53871* (2013.01); *H02P 6/16* (2013.01)

(58) Field of Classification Search
CPC ........ H02P 27/08; H02P 6/16; H02M 7/53871
USPC ........................................... 318/504
See application file for complete search history.

(56) References Cited

U.S. PATENT DOCUMENTS

| | | | |
|---|---|---|---|
| 5,936,856 A * | 8/1999 | Xiang | H02J 3/01 323/356 |
| 6,710,495 B2 | 3/2004 | Lipo et al. | |
| 7,760,527 B2 | 7/2010 | Baudesson et al. | |
| 7,944,723 B2 | 5/2011 | Crane | |
| 8,044,631 B2 | 10/2011 | Dai et al. | |
| 8,169,179 B2 | 5/2012 | Mohan et al. | |
| 8,223,511 B2 | 7/2012 | Cheng et al. | |
| 8,866,548 B2 | 10/2014 | Drogi et al. | |
| 9,083,230 B2 | 7/2015 | Narimani et al. | |
| 9,325,252 B2 | 4/2016 | Narimani et al. | |
| 9,362,839 B2 | 6/2016 | Wei et al. | |
| 2013/0329471 A1 | 12/2013 | Escobar et al. | |
| 2014/0334213 A1* | 11/2014 | Jussila | H02M 7/483 363/132 |
| 2015/0012161 A1* | 1/2015 | Kanekawa | H02M 1/32 701/22 |
| 2016/0294303 A1* | 10/2016 | White | H02M 7/487 |

OTHER PUBLICATIONS

Motor Bearing Current Phenomenon and 3-Level Inverter Technology, Doc#: AN.G7.02, Copyright Yaskawa Electric America, Inc.© 2005, Jun. 22, 2005, pp. 1-13.

* cited by examiner

*Primary Examiner* — Shawki S Ismail
*Assistant Examiner* — Muhammad S Islam
(74) *Attorney, Agent, or Firm* — Bell & Manning, LLC (57) ABSTRACT

An inverter includes a plurality of inverter legs that each includes first, second, and third switches. A first control line connected to the first switch receives a first control signal. A second control line connected to the second switch receives a second control signal. A third control line connected to the third switch receives the first control signal. The first, second, and third switches are connected sequentially in series. A first connector line is connected between the first switch and the second switch and to a first winding of an electric machine. A second connector line is connected between the second switch and the third switch and to a second winding of the electric machine. The second control signal is complementary to the first control signal.

20 Claims, 11 Drawing Sheets

INVERTER FOR COMMON MODE VOLTAGE CANCELLATION

BACKGROUND

In electrical systems, there is typically a power source that produces power, and an electrical load that consumes the produced power. The various sources and loads often have different electrical properties and require power electronics to transfer power between components. A power converter is an electrical device for converting electrical energy from one form to another, such as between alternating current (AC) and direct current (DC), between different voltages or frequencies, or a combination of these. A specific type of converter, called an inverter, changes DC to AC. In a drive system, a voltage source inverter (VSI) may be used to transfer real power from a DC power source to an AC load.

In a three-phase AC system, the common-mode (CM) voltage can be defined as a voltage difference between the power source ground and the neutral point of a three-phase load. If the load is an AC motor, the neutral point of the load means the stator neutral of the motor. Inverters generate CM voltages relative to the power source ground that cause coupling currents through parasitic capacitances inside the motor (load). The main source of bearing currents is the capacitance-coupling currents that return via the motor bearings back to the ground. The bearing damage in inverter-driven motors is mainly caused by the shaft voltage and the bearing currents created by the common-mode voltage.

Conventional VSIs consist of two or three phase-legs, each of which is a series connection of two semiconductor switches. During normal operation, the output potential of each phase leg with respect to ground is continuously switched between a positive and a negative DC bus potential based on a pulse width modulation of the switches. As a result, the CM voltage imposed on the load also exhibits six step-changes during each switching cycle. Each step-change induces a charging or discharging current into the parasitic capacitances between load and ground that leads to issues such as electromagnetic interference emissions, inverter losses, and motor damage. CM chokes and filters may be used to mitigate the CM voltage induced issues. However, since CM chokes have to block a significant amount of CM voltage, they are bulky in size, and constitute a large portion of the product cost.

SUMMARY

In an example embodiment, an inverter is provided. The inverter includes, but is not limited to, a positive direct current (DC) line, a negative DC line, and a plurality of inverter legs. Each inverter leg includes, but is not limited to, a first switch, a second switch, a third switch, a first switch control line, a second switch control line, and a third switch control line. The first switch control line is connected to the first switch and configured to receive a first control signal to control an on or off state of the first switch. The second switch control line is connected to the second switch and configured to receive a second control signal to control an on or off state of the second switch. The third switch control line is connected to the third switch and configured to receive the first control signal to control an on or off state of the third switch. A first connector line is connected between the first switch and the second switch. A second connector line is connected between the second switch and the third switch. The first switch, the second switch, and the third switch are connected sequentially in series between the positive DC line and the negative DC line. The first connector line is configured to be connected to a first winding of an electric machine. The second connector line is configured to be connected to a second winding of the electric machine. The second control signal is complementary to the first control signal.

In another example embodiment, an electric machine drive is provided. The electric machine drive includes, but is not limited to, the inverter and a controller. The controller includes, but is not limited to, a first control signal line and a second control signal line. The controller is configured to generate a first control signal on the first control signal line and to generate a second control signal on the second control signal line. The first control signal is complementary to the second control signal. The first control signal controls an on or off state of the first switch and the third switch together. The second control signal controls an on or off state of the second switch.

In yet another example embodiment, an electric machine system is provided. The electric machine drive includes, but is not limited to, the inverter, the controller, and an electric machine. The electric machine includes, but is not limited to, a stator, a rotor configured to rotate relative to the stator, a first winding wound around at least a first portion of the stator, and a second winding wound around at least a second portion of the stator. The first connector line is configured to be connected to the first winding. The second connector line is configured to be connected to the second winding.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
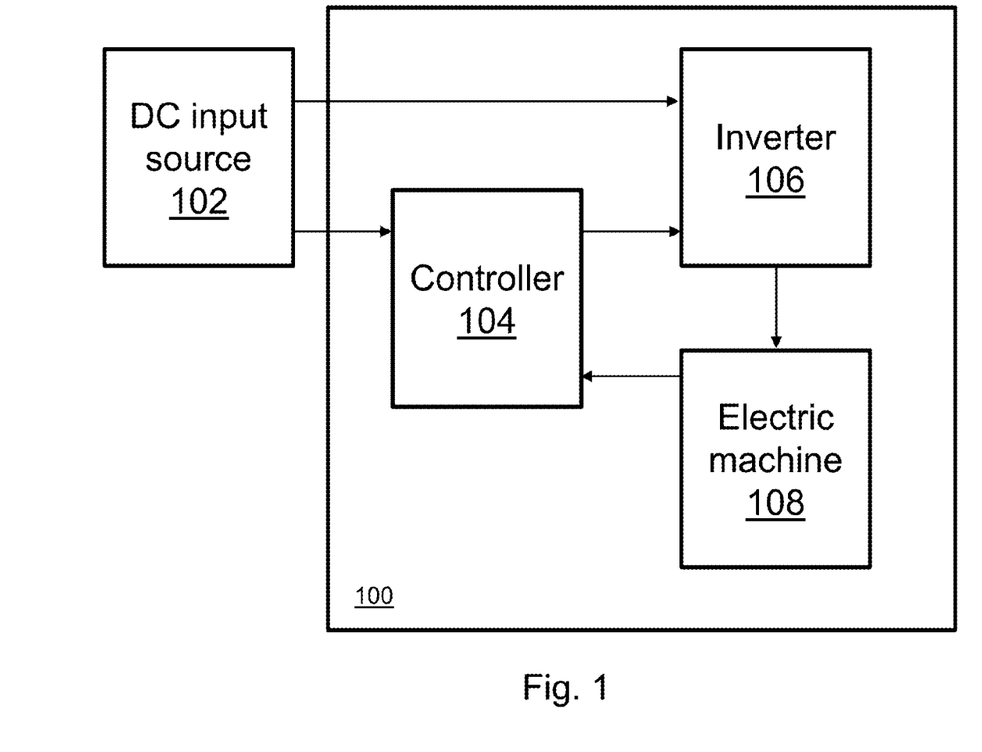
FIG. 1 is a block diagram of an electric machine system connected to an input source in accordance with an illustrative embodiment.

Referring to FIG. 1, an electric machine system 100 may include a controller 104, an inverter 106, and an electric machine 108. Electric machine 108 may be a motor such as an induction motor, a reluctance motor, a synchronous motor, etc. that may include windings and/or permanent magnets to generate mechanical power. Inverter 106 converts DC power from DC input source 102 to the AC power supplied to electric machine 108 to generate the mechanical power.

A direct current (DC) input source 102 is electrically connected to controller 104 and to inverter 106. DC input source 102 can include one or more DC sources. DC input source 102 may be a DC grid, batteries, a dc output of a single-phase or multi-phase passive or active rectifier, etc. that provides approximately constant instantaneous power flow. DC input source 102 may provide DC power and DC input source measured signals to controller 104. DC input source 102 provides DC power to inverter 106. Inverter 106 provides alternating current (AC) power to electric machine 108.

Controller 104 may be electrically connected to DC input source 102, inverter 106, and electric machine 108. Controller 104 controls the supply of power by inverter 106 to electric machine 108 through control signals input to inverter 106. The control signals may be generated by controller 104 based on the DC input source measured signals received from DC input source 102 and signals measured and received from electric machine 108. In an illustrative embodiment, controller 104 implements a closed loop current control to determine the control signals though other control algorithms may be implemented by controller 104. Illustrative control methods include direct/indirect field orientation control and direct torque control. Illustrative modulation techniques include sine pulse width modulation (PWM), space vector PWM, discrete PWM, and random PWM. Illustrative sensing techniques include a hall effect sensor, an encoder, a resolver, and self-sensing.

Figure 2:
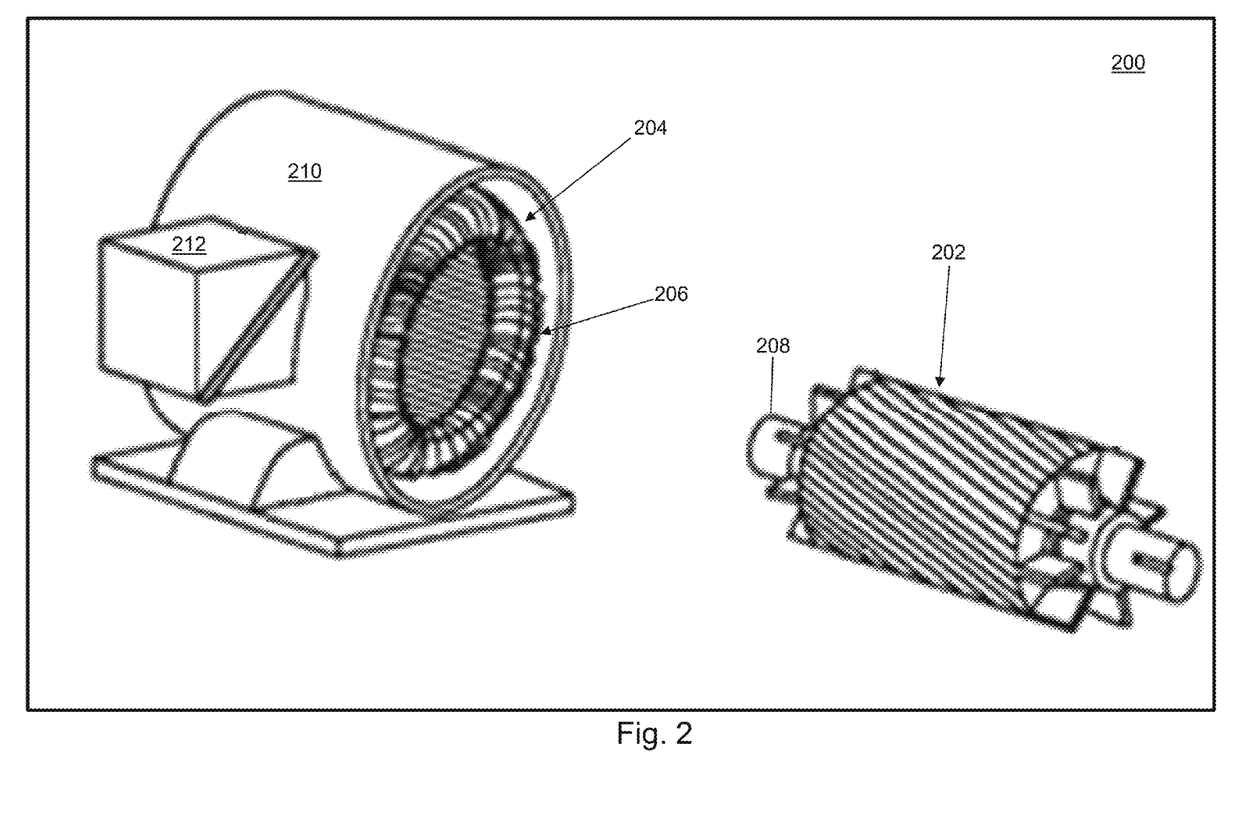
FIG. 2 depicts an electric machine of FIG. 1 in accordance with an illustrative embodiment.

Referring to FIG. 2, an AC motor 200 is shown in accordance with an illustrative embodiment. AC motor 200 is merely an example of electric machine 108. AC motor 200 may include a rotor 202 and a stator 204 with a stator winding 206 in various arrangements as understood by a person of skill in the art. AC motor 200 may be an AC electric motor in which the electric current in a rotor winding needed to produce torque is induced by electromagnetic induction from a magnetic field formed by a current in stator winding 206. For illustration, rotor 202 of AC motor 200 may be wound type, squirrel-cage type, etc. AC motor 200 further may be configured to have any size rating. A shaft 208 is mounted to rotate with rotor 202.

Stator winding 206 may include one or more sets of windings each having one or more phases of electrical energy that are distributed around stator 206. Rotor 202 is mounted relative to stator 204 in various axial and radial arrangements. The illustrative embodiment of FIG. 2, shows an interior, radial mounted rotor 202 that is mounted within stator 204. Stator 204 is mounted within a motor housing 210. Controller 104 and inverter 106 can be mounted inside a controller housing 212 of electric machine 108 and connected to stator winding 206 as well as other components of AC motor 200.

Figure 3:
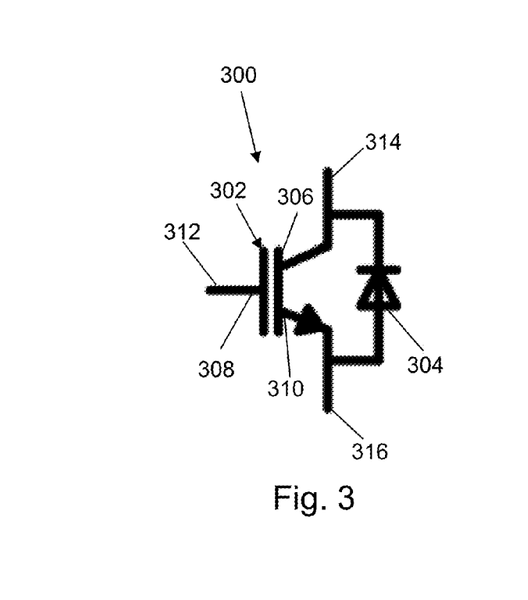
FIG. 3 depicts a switch circuit in accordance with an illustrative embodiment.

Referring to FIG. 3, a switch 300 is shown in accordance with an illustrative embodiment. Switch 300 may include a transistor 302 and a diode 304. Transistor 302 may include a drain (or collector) 306, a gate (or base) 308, and a source (or emitter) 310 as in a metal-oxide-semiconductor field-effect transistor (MOSFET), an insulated-gate bipolar transistor (IGBT), a bipolar junction transistor, etc. Diode 304 is connected anti-parallel across source 310 and drain 306 of transistor 302. Depending on the switching logic and whether transistor 302 is an n-type or a p-type, drain 306 and source 310 may be reversed. A voltage applied to gate 308 determines a switching state of transistor 302. In an illustrative embodiment, transistor 302 is an insulated-gate field-effect transistor such as a MOSFET, IGBT, Gallium Nitride (GaN) device, Silicon Carbide (SiC) device, other Silicon based device, etc.

A switch control line 312 is electrically connected between gate 308 and controller 104 to provide a control signal to switch 300. Depending on an amplitude of the control signal, switch 300 allows current flow from drain 306 to source 310 and onto a source line 316, or blocks current flow from drain 306 to source 310 to allow a current flow through diode 304 from source line 316 to a drain line 314 that bypasses transistor 302. Current flow through transistor 302 from drain 306 to source 310 may be termed an "on" state of switch 300. Blocking current flow through transistor 302 from drain 306 to source 310 may be termed an "off" state of switch 300. When switch 300 is in the "off" state, current can flow through diode 304 of switch 300.

Figure 4:
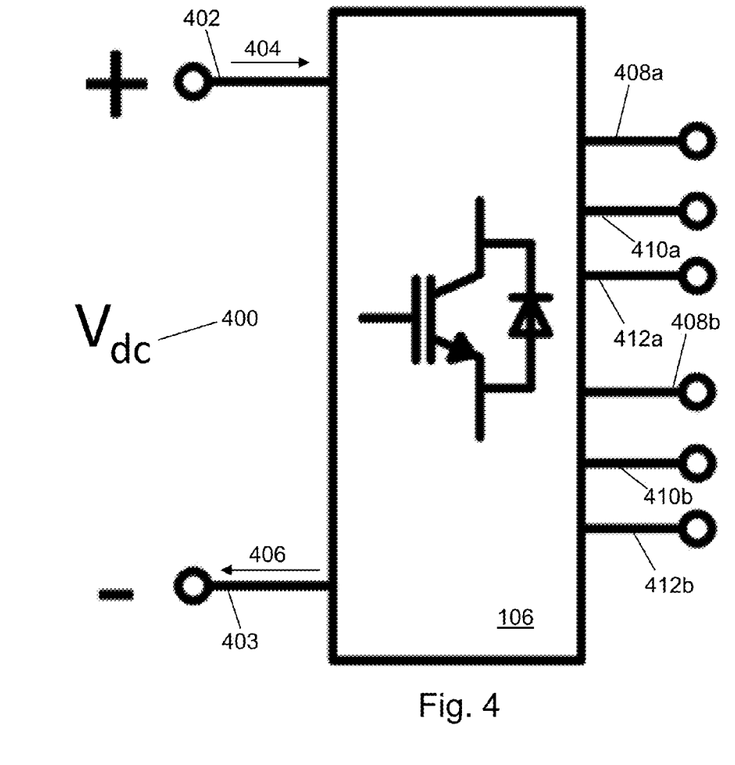
FIG. 4 is a block diagram of a 3-phase inverter of the electric machine system of FIG. 1 in accordance with an illustrative embodiment.

Referring to FIG. 4, a block diagram of inverter 106 is shown in accordance with an illustrative embodiment. A $V_{dc}$ 400 is applied across a positive DC line 402 and a negative DC line 403. An input current 404 is provided through positive DC line 402, and an output current 406 is provided through negative DC line 403. $V_{dc}$ 400 represents the voltage from DC input source 102. In the illustrative embodiment, inverter 106 includes two sets of three phase lines that output a current. A first-phase current $I_a$ through a first-phase line 408a, a second-phase current $I_b$ through a second-phase line 410a, a third-phase current $I_c$ through a third-phase line 412a, a fourth-phase current $I_a'$ through a fourth-phase line 408b, a fifth-phase current $I_b'$ through a fifth-phase line 410b, and a sixth-phase current $I_c'$ through a third sixth phase line 412b. The phase currents provide AC power to electric machine 108. In the illustrative embodiment, inverter 106 is a three-phase inverter though a different number of phases may be output from inverter 106 in alternative embodiments.

Figure 5:
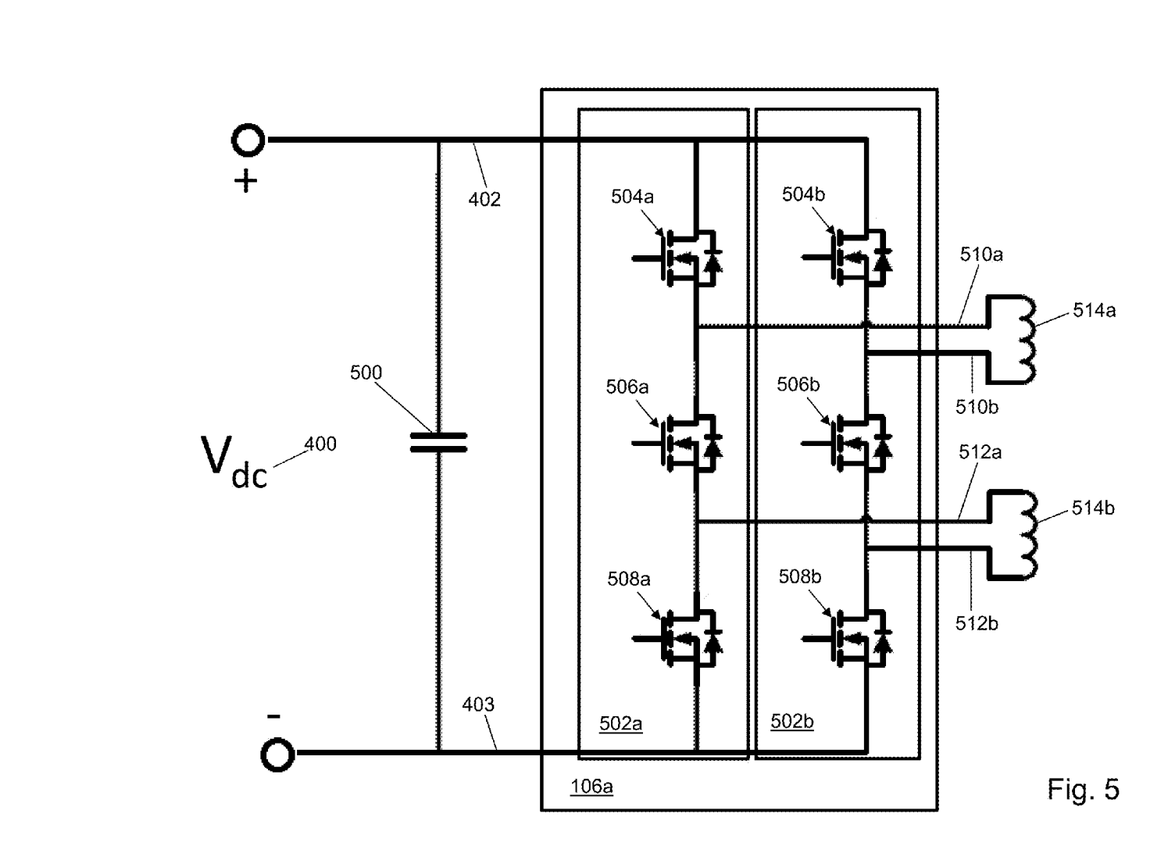
FIG. 5 is a circuit diagram of an inverter of the electric machine system of FIG. 1 in accordance with a first illustrative embodiment.

Referring to FIG. 5, a circuit diagram of a first inverter 106a is shown in accordance with an illustrative embodiment. First inverter 106a is a first illustrative embodiment of inverter 106. A capacitor 500 may be connected across $V_{dc}$ 400 between positive DC line 402 and negative DC line 403 of first inverter 106a. First inverter 106a may include a first leg 502a and a second leg 502b. First leg 502a includes a first switch 504a, a second switch 506a, and a third switch 508a connected sequentially in series between positive DC line 402 and negative DC line 403. Similarly, second leg 502b includes a first switch 504b, a second switch 506b, and a third switch 508b connected sequentially in series between positive DC line 402 and negative DC line 403.

Each of first switch 504a, second switch 506a, and third switch 508a of first leg 502a and of first switch 504b, second switch 506b, and third switch 508b of second leg 502b is an instance of switch 300 with transistor 302 and diode 304. As a result, transistor 302 of each switch of each leg of first inverter 106a includes drain 306, gate 308, and source 310.

Drain 306 of first switch 504a of first leg 502a is connected to positive DC line 402. Source 310 of first switch 504a of first leg 502a is connected to drain 306 of second switch 506a of first leg 502a. Source 310 of second switch 506a of first leg 502a is connected to drain 306 of third switch 508a of first leg 502a. Source 310 of third switch 508a of first leg 502a is connected to negative DC line 403.

Drain 306 of first switch 504b of second leg 502b is connected to positive DC line 402. Source 310 of first switch 504b of second leg 502b is connected to drain 306 of second switch 506b of second leg 502b. Source 310 of second switch 506b of second leg 502b is connected to drain 306 of third switch 508b of second leg 502b. Source 310 of third switch 508b of second leg 502b is connected to negative DC line 403.

A first connector line 510a of first leg 502a is connected between source 310 of first switch 504a of first leg 502a and drain 306 of second switch 506a of first leg 502a. A second connector line 512a of first leg 502a is connected between source 310 of second switch 506a of first leg 502a and drain 306 of third switch 508a of first leg 502a.

A first connector line 510b of second leg 502b is connected between source 310 of first switch 504b of second leg 502b and drain 306 of second switch 506b of second leg 502b. A second connector line 512b of second leg 502b is connected between source 310 of second switch 506b of second leg 502b and drain 306 of third switch 508b of second leg 502b.

A first stator winding 514a is connected between first connector line 510a of first leg 502a and first connector line 510b of second leg 502b. A second stator winding 514b is connected between second connector line 512a of first leg 502a and second connector line 512b of second leg 502b. For illustration, first stator winding 514a and second stator winding 514b are wound about stator 206 of AC motor 200.

Though not shown, each gate 308 of first switch 504a, second switch 506a, and third switch 508a of first leg 502a and of first switch 504b, second switch 506b, and third switch 508b of second leg 502b is connected to controller 104 to receive control signals to control a switching state of each switch. A first control signal is provided simultaneously to first switch 504a and to third switch 508a of first leg 502a. A second control signal is inverted relative to or "complementary to" the first control signal and is applied simultaneously to second switch 506a of first leg 502a. Thus, if the first control signal is "A" to switch on first switch 504a and third switch 508a of first leg 502a, the second control signal is "-A" to switch off second switch 506b of first leg 502a, and vice versa.

A third control signal is provided simultaneously to first switch 504b and to third switch 508b of second leg 502b. A fourth control signal is inverted relative to or "complementary to" the third control signal and is applied simultaneously to second switch 506b of second leg 502b. As understood by a person of skill in the art, the first control signal, the second control signal, the third control signal, and the fourth control signal are pulse width modulated signals selected to generate an AC waveform from the DC input waveform by rapidly switching the states of the switches of first inverter 106a on and off.

A first voltage results across first stator winding 514a, and a first current flows through first stator winding 514a. Correspondingly, a second voltage and a second current result across and flow through second stator winding 514b. The second voltage and the second current are 180 degrees out of phase relative to the first voltage and the first current, respectively.

First inverter 106a cancels a total CM voltage by generating two equal-amplitude, opposite-signed CM voltages on first stator winding 514a and second stator winding 514b. As a result, AC motor 200, which is an illustrative embodiment of electric machine 108, remains at ground potential, and no current flows to ground.

Second switch 506a of first leg 502a and second switch 506b of second leg 502b may be rated to support a maximum DC power (voltage). First switch 504a and third switch 508a of first leg 502a and first switch 504b and third switch 508b of second leg 502b may be rated to support half the maximum DC power because the power (voltage) is split between the first and third switches of each leg.

Figure 6:
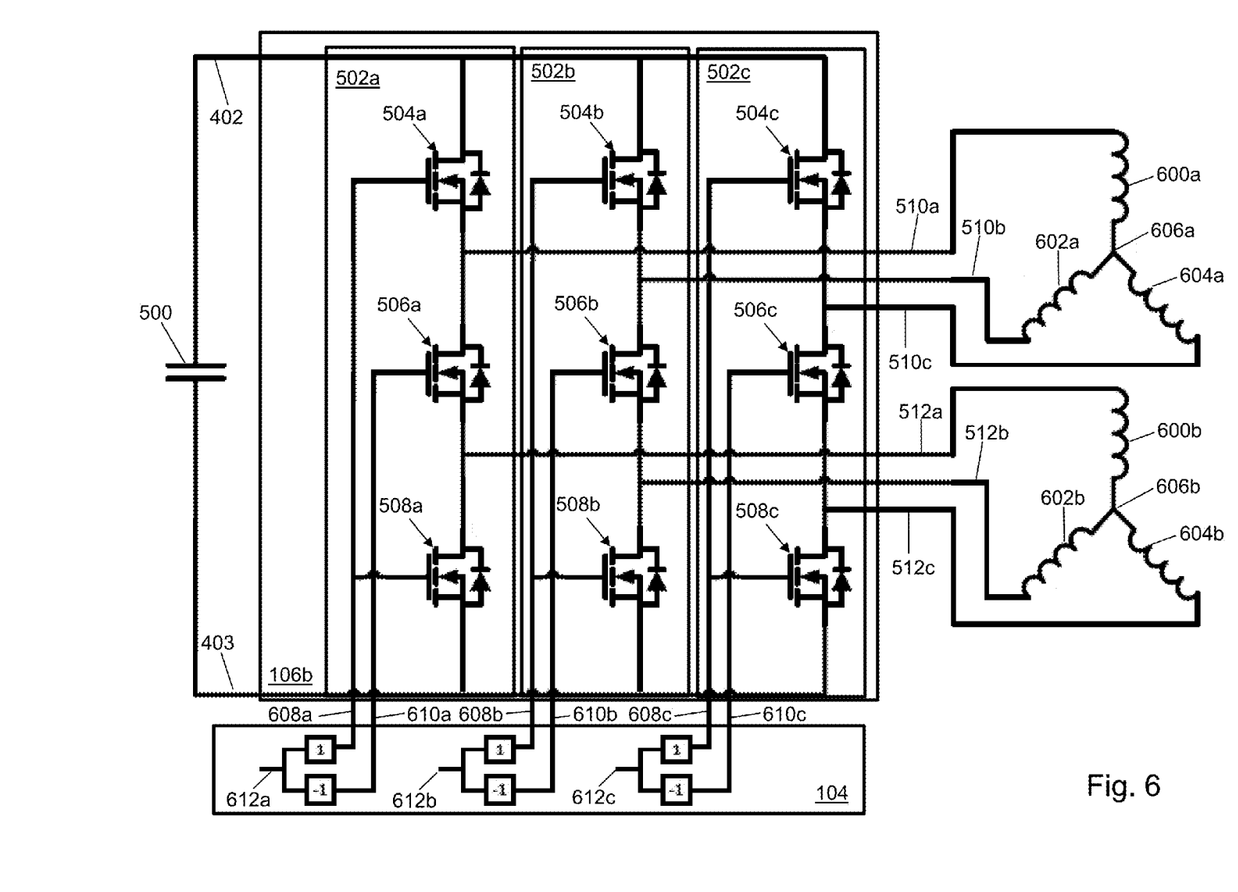
FIG. 6 is a circuit diagram of an inverter of the electric machine system of FIG. 1 in accordance with a second illustrative embodiment.

Referring to FIG. 6, a circuit diagram of a second inverter 106b is shown in accordance with an illustrative embodiment. Second inverter 106a is a second illustrative embodiment of inverter 106. Capacitor 500 may be connected across $V_{dc}$ 400 between positive DC line 402 and negative DC line 403 of second inverter 106b. Negative DC line 403 may be grounded at a ground potential.

Second inverter 106b may include first leg 502a, second leg 502b, and a third leg 502c. Similar to first leg 502a and second leg 502b, third leg 502c includes a first switch 504c, a second switch 506c, and a third switch 508c connected sequentially in series between positive DC line 402 and negative DC line 403. Each of first switch 504c, second switch 506c, and third switch 508c of third leg 502c is an instance of switch 300 with transistor 302 and diode 304. As a result, transistor 302 of each switch of each leg of second inverter 106b includes drain 306, gate 308, and source 310.

Drain 306 of first switch 504c of third leg 502c is connected to positive DC line 402. Source 310 of first switch 504c of third leg 502c is connected to drain 306 of second switch 506c of third leg 502c. Source 310 of second switch 506c of third leg 502c is connected to drain 306 of third switch 508c of third leg 502c. Source 310 of third switch 508c of third leg 502c is connected to negative DC line 403.

A first connector line 510c of third leg 502c is connected between source 310 of first switch 504c of third leg 502c and drain 306 of second switch 506c of third leg 502c. A second connector line 512c of third leg 502c is connected between source 310 of second switch 506c of third leg 502c and drain 306 of third switch 508c of third leg 502c.

A first stator winding 600a is connected between first connector line 510a of first leg 502a and a first common neutral connector 606a. A second stator winding 602a is connected between first connector line 510b of second leg 502b and first common neutral connector 606a. A third stator winding 604a is connected between first connector line 510c of third leg 502c and first common neutral connector 606a. For illustration, first stator winding 600a, second stator winding 602a, and third stator winding 604a are wound about stator 206 of AC motor 200 and connected to form a first three-phase wye connection configuration. In an alternative embodiment, first stator winding 600a, second stator winding 602a, and third stator winding 604a may be wound about stator 206 of AC motor 200 and connected to form a first three-phase delta connection configuration.

First stator winding 600a is supplied a first current $I_a$ through first connector line 510a of first leg 502a. Second stator winding 602a is supplied a second current $I_b$ through first connector line 510b of second leg 502b. Third stator winding 604a is supplied a third current $I_c$ through first connector line 510c of third leg 502c. As understood by a person of skill in the art, the currents applied to the machine windings are 360/n degrees out of phase with respect to each other, where n represents a number of phases. Thus, $I_a$, $I_b$, and $I_c$ are 120 degrees out of phase with respect to each other.

A fourth stator winding 600b is connected between second connector line 512a of first leg 502a and a second common neutral connector 606b. A fifth stator winding 602b is connected between second connector line 512b of second leg 502b and second common neutral connector 606b. A sixth stator winding 604b is connected between second connector line 512c of third leg 502c and second common neutral connector 606b. For illustration, fourth stator winding 600b, fifth stator winding 602b, and sixth stator winding 604b are wound about stator 206 of AC motor 200 and connected to form a second three-phase wye connection configuration. In an alternative embodiment, fourth stator winding 600b, fifth stator winding 602b, and sixth stator winding 604b may be wound about stator 206 of AC motor 200 and connected to form a second three-phase delta connection configuration.

Fourth stator winding 600b is supplied a fourth current $I_a'$ through second connector line 512a of first leg 502a. Fifth stator winding 602b is supplied a second current $I_b'$ through second connector line 512b of second leg 502b. Sixth stator winding 604b is supplied a third current $I_c'$ through second connector line 512c of third leg 502c. As understood by a person of skill in the art, the currents applied to the windings of electric machine 108 are 360/n degrees out of phase with each other. Thus, $I_a'$, $I_b'$, and $I_c'$ are 120 degrees out of phase with respect to each other. $I_a$ and $I_a'$ are 180 degrees out of phase with respect to each other. $I_b$ and $I_b'$ are 180 degrees out of phase with respect to each other. $I_c$ and $I_c'$ are 180 degrees out of phase with respect to each other.

Gate 308 of first switch 504a and third switch 508a of first leg 502a are both connected to a first control line 608a of controller 104 to receive a first control signal to control the switching state of each switch together. Gate 308 of second switch 506b of first leg 502a is connected to a second control line 610a of controller 104 to receive a second control signal to control the switching state of second switch 506b of first leg 502a. The second control signal is inverted relative to or "complementary to" the first control signal and is applied simultaneously to second switch 506a of first leg 502a.

Gate 308 of first switch 504b and third switch 508b of second leg 502b are both connected to a third control line 608b of controller 104 to receive a third control signal to control the switching state of each switch together. Gate 308 of second switch 506b of second leg 502b is connected to a fourth control line 610b of controller 104 to receive a fourth control signal to control the switching state of second switch 506b of second leg 502b. The fourth control signal is inverted relative to or "complementary to" the third control signal and is applied simultaneously to second switch 506b of second leg 502b.

Gate 308 of first switch 504c and third switch 508c of third leg 502c are both connected to a fifth control line 608c of controller 104 to receive a fifth control signal to control the switching state of each switch together. Gate 308 of second switch 506c of third leg 502c is connected to a sixth control line 610c of controller 104 to receive a sixth control signal to control the switching state of second switch 506c of third leg 502c. The sixth control signal is inverted relative to or "complementary to" the fifth control signal and is applied simultaneously to second switch 506c of third leg 502c.

As understood by a person of skill in the art, the first control signal, the second control signal, the third control signal, the fourth control signal, the fifth control signal, and the sixth control signal are pulse width modulated signals selected to generate an AC waveform from the DC input waveform by rapidly switching the states of the switches of second inverter 106b on and off. For illustration, there may be eight possible switching vectors for second inverter 106b, V0 through V7 with six active switching vectors and two zero vectors based on the complementary operation of the second switch of each leg relative to the first and third switches of each leg, and the common control of the first and third switches of each leg. As a result, control algorithms for inverters that include two switches per leg may be used to control operation of second inverter 106b subject to the common control of the first and third switches of each leg.

Second switch 506a of first leg 502a, second switch 506b of second leg 502b, and second switch 506c of third leg 502c may be rated to support a maximum DC power (voltage). First switch 504a and third switch 508a of first leg 502a, first switch 504b and third switch 508b of second leg 502b, and first switch 504c and third switch 508c of third leg 502c may be rated to support half the maximum DC power because the power (voltage) is split between the first and third switches of each leg.

Second inverter 106b cancels a total CM voltage by generating two equal-amplitude, opposite-signed CM voltages on the two sets of three phase windings, a first set of windings that includes first stator winding 600a, second stator winding 602a, and third stator winding 604a, and a second set of windings that includes fourth stator winding 600b, fifth stator winding 602b, and sixth stator winding 604b. As a result, AC motor 200, which is an illustrative embodiment of electric machine 108, remains at ground potential, and no current flows to ground.

Figure 7:
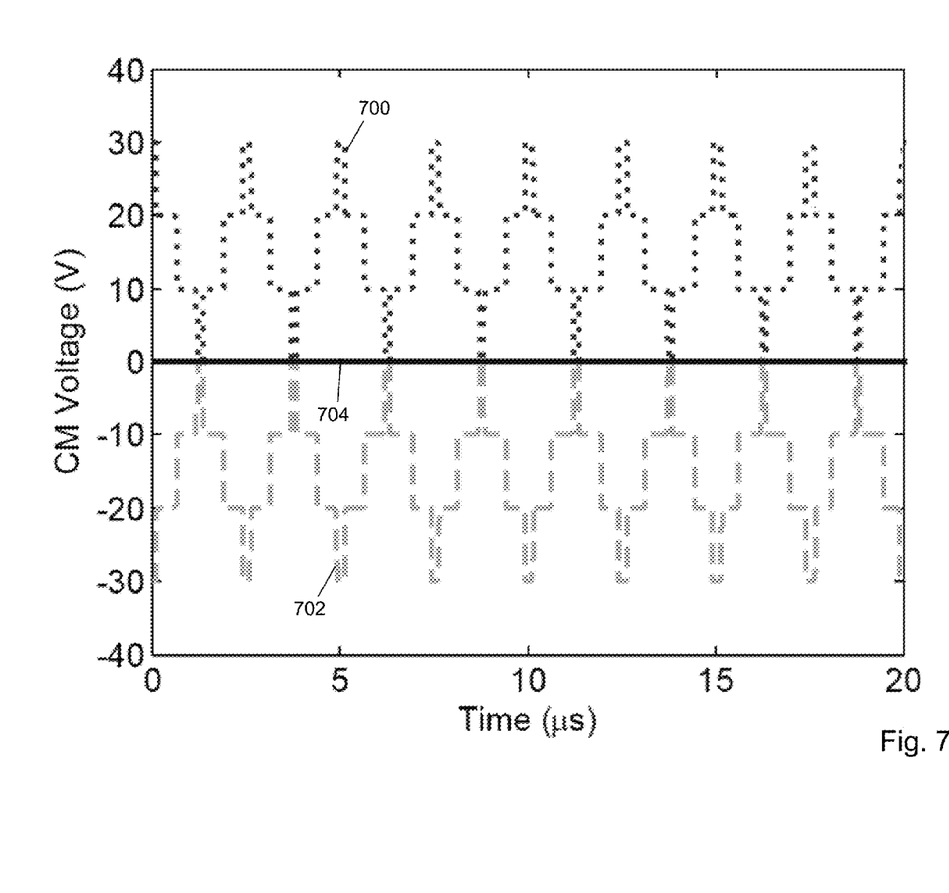
FIG. 7 shows a CM voltage generated using the inverter of FIG. 6.

Referring to FIG. 7, a CM voltage generated using second inverter 106 is shown. A first CM voltage curve 700 shows the CM voltage generated on the first set of windings. A second CM voltage curve 702 shows the CM voltage generated on the second set of windings. A third CM voltage curve 704 shows the total CM voltage generated, which is zero as expected due to the cancellation effect.

Figure 8:
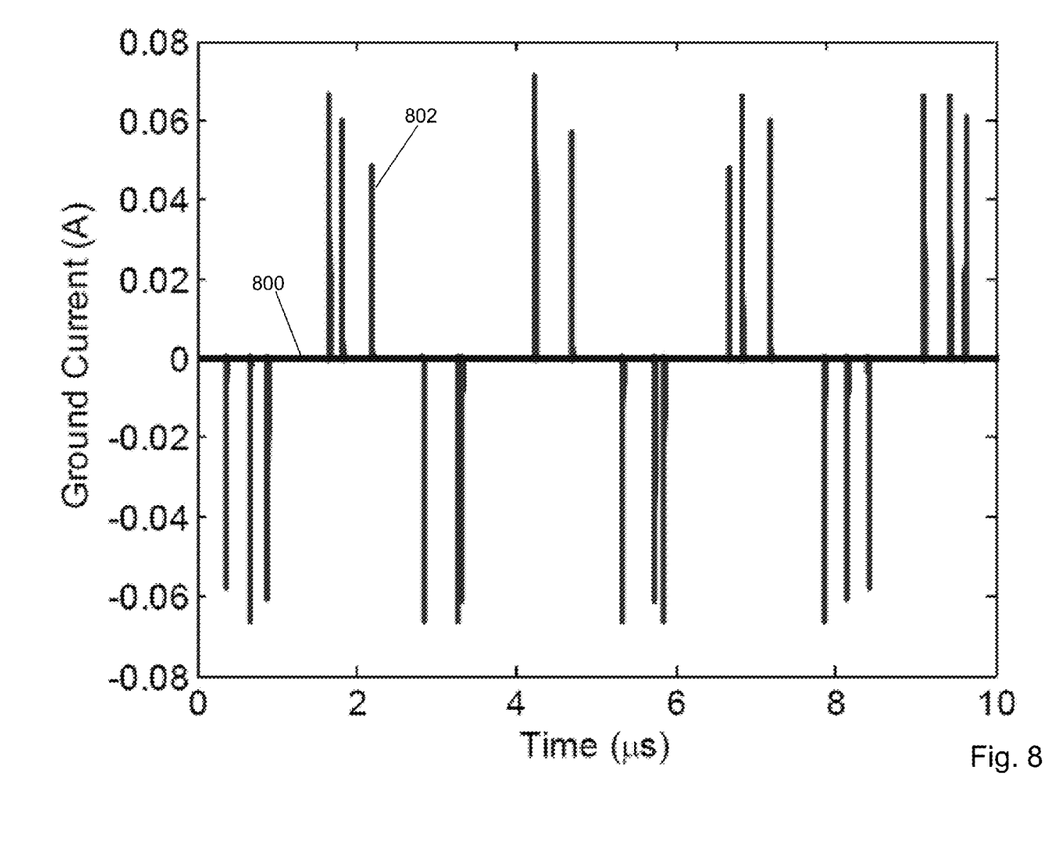
FIG. 8 shows a ground leakage current comparison between a conventional inverter and the inverter of FIG. 6.

Referring to FIG. 8, a ground leakage current comparison is shown between second inverter 106 and a conventional inverter that includes two switches per leg. A first leakage current curve 800 shows the zero ground leakage current that results using second inverter 106. A second leakage current curve 802 shows the ground leakage current spikes that result using the conventional inverter when the controller switches the state of the switches of the conventional inverter. Cancellation of the total CM voltage eliminates the ground leakage current in electric machine 108 using second inverter 106.

Figure 9:
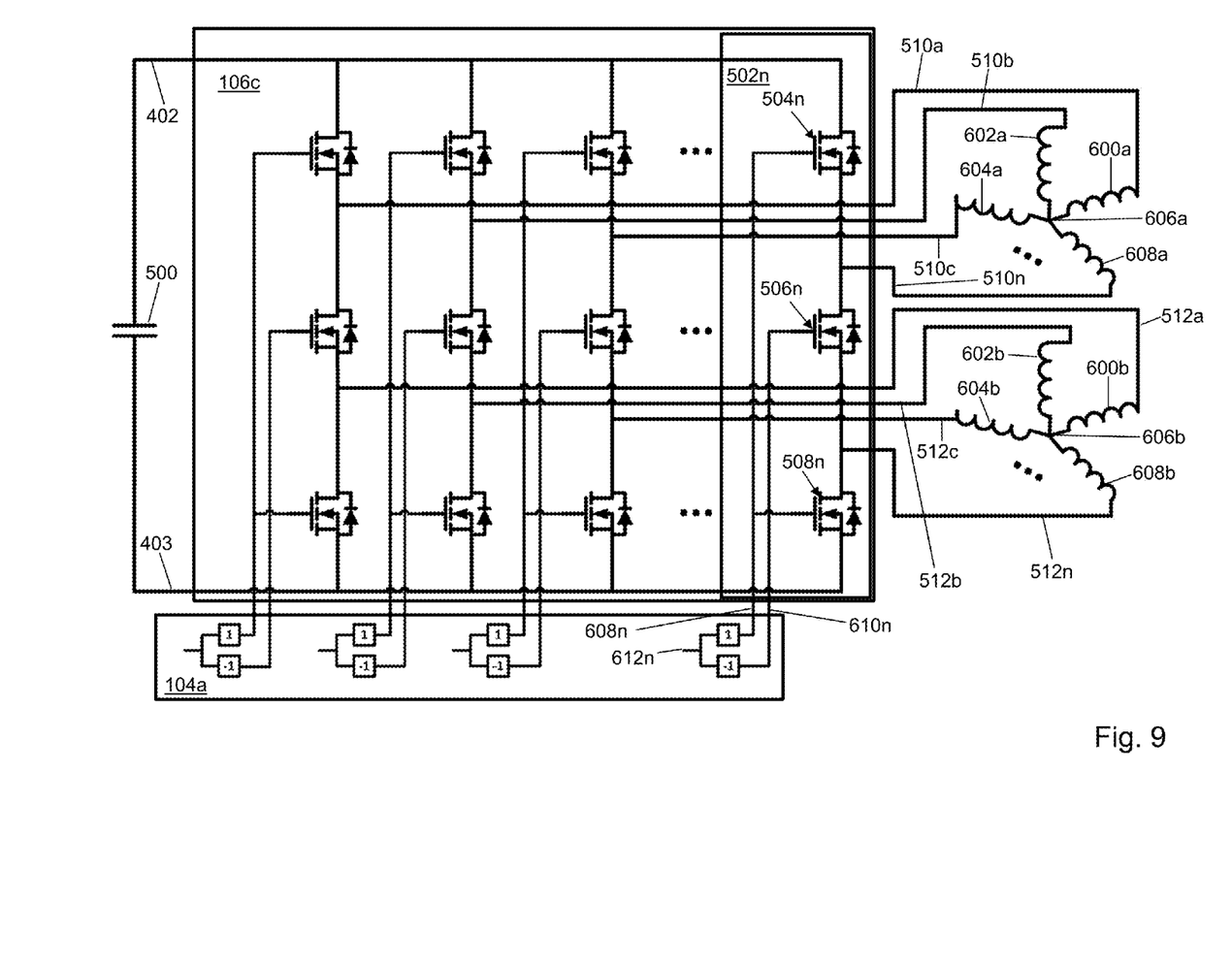
FIG. 9 is a circuit diagram of an inverter of the electric machine system of FIG. 1 in accordance with a third illustrative embodiment.

Referring to FIG. 9, a circuit diagram of a third inverter 106c is shown in accordance with an illustrative embodiment. Third inverter 106c is a third illustrative embodiment of inverter 106. Capacitor 500 may be connected across $V_{dc}$ 400 between positive DC line 402 and negative DC line 403 of third inverter 106c, which may be grounded.

Third inverter 106c may include first leg 502a, second leg 502b, third leg 502c, . . . , and an nth leg 502n. Similar to first leg 502a, second leg 502b, and third leg 502c, nth leg 502n includes a first switch 504n, a second switch 506n, and a third switch 508n connected sequentially in series between positive DC line 402 and negative DC line 403.

Each of first switch 504n, second switch 506n, and third switch 508n of nth leg 502n is an instance of switch 300 with transistor 302 and diode 304. As a result, transistor 302 of each switch of each leg of third inverter 106c includes drain 306, gate 308, and source 310.

Drain 306 of first switch 504n of nth leg 502n is connected to positive DC line 402. Source 310 of first switch 504n of nth leg 502n is connected to drain 306 of second switch 506n of nth leg 502n. Source 310 of second switch 506n of nth leg 502n is connected to drain 306 of third switch 508n of nth leg 502n. Source 310 of third switch 508n of nth leg 502n is connected to negative DC line 403.

A first connector line 510n of nth leg 502n is connected between source 310 of first switch 504n of nth leg 502n and drain 306 of second switch 506n of nth leg 502n. A second connector line 512n of nth leg 502n is connected between source 310 of second switch 506n of nth leg 502n and drain 306 of third switch 508n of nth leg 502n.

A first nth stator winding 608a is connected between first connector line 510n of nth leg 502n and first common neutral connector 606a. A second nth stator winding 608b is connected between second connector line 512n of nth leg 502n and second common neutral connector 606b. For illustration, first nth stator winding 608a and second nth stator winding 608b are also wound about stator 206 of AC motor 200. First stator winding 600a, second stator winding 602a, third stator winding 604a, and first nth stator winding 608a are connected to form a first n-phase wye connection configuration. First stator winding 600b, second stator winding 602b, third stator winding 604b, and second nth stator winding 608b are connected to form a second n-phase wye connection configuration. In an alternative embodiment, first stator winding 600a, second stator winding 602a, third stator winding 604a, and second nth stator winding 608a may be connected to form a first n-phase polygon connection configuration, and first stator winding 600b, second stator winding 602b, third stator winding 604b, and second nth stator winding 608b may be connected to form a second n-phase polygon connection configuration.

First nth stator winding 608a is supplied a first nth current $I_n$ through first connector line 510n of nth leg 502n. Second nth stator winding 608a is supplied a second nth current $I_n'$ through second connector line 512n of nth leg 502n. $I_n$ and $I_n'$ are 180 degrees out of phase with respect to each other.

Gate 308 of first switch 504n and third switch 508n of nth leg 502n are both connected to a first nth control line 608n of controller 104 to receive a first nth control signal to control the switching state of each switch together. Gate 308 of second switch 506n of nth leg 502n is connected to a second nth control line 610n of controller 104 to receive a second nth control signal to control the switching state of second switch 506b of nth leg 502n. The second nth control signal is inverted relative to or "complementary to" the first nth control signal and is applied simultaneously to second switch 506n of nth leg 502n. The first nth control signal and the second nth control signal are also pulse width modulated signals selected to generate an AC waveform from the DC input waveform by rapidly switching the states of the switches of third inverter 106c on and off. The AC waveform includes n×2 phases.

Second switch 506n of nth leg 502n may be rated to support a maximum DC power (voltage). First switch 504n and third switch 508n of nth leg 502n may be rated to support half the maximum DC power because the power (voltage) is split between the first and third switches of each leg.

Third inverter 106c cancels a total CM voltage by generating two equal-amplitude, opposite-signed CM voltages on the two sets of n-phase windings, set one that includes first stator winding 600a, second stator winding 602a, third stator winding 604a, . . . , and first nth stator winding 608a, and set two that includes fourth stator winding 600b, fifth stator winding 602b, sixth stator winding 604b, . . . , and second nth stator winding 608b. As a result, AC motor 200, which is an illustrative embodiment of electric machine 108, remains at ground potential, and no current flows to ground.

Figure 10:
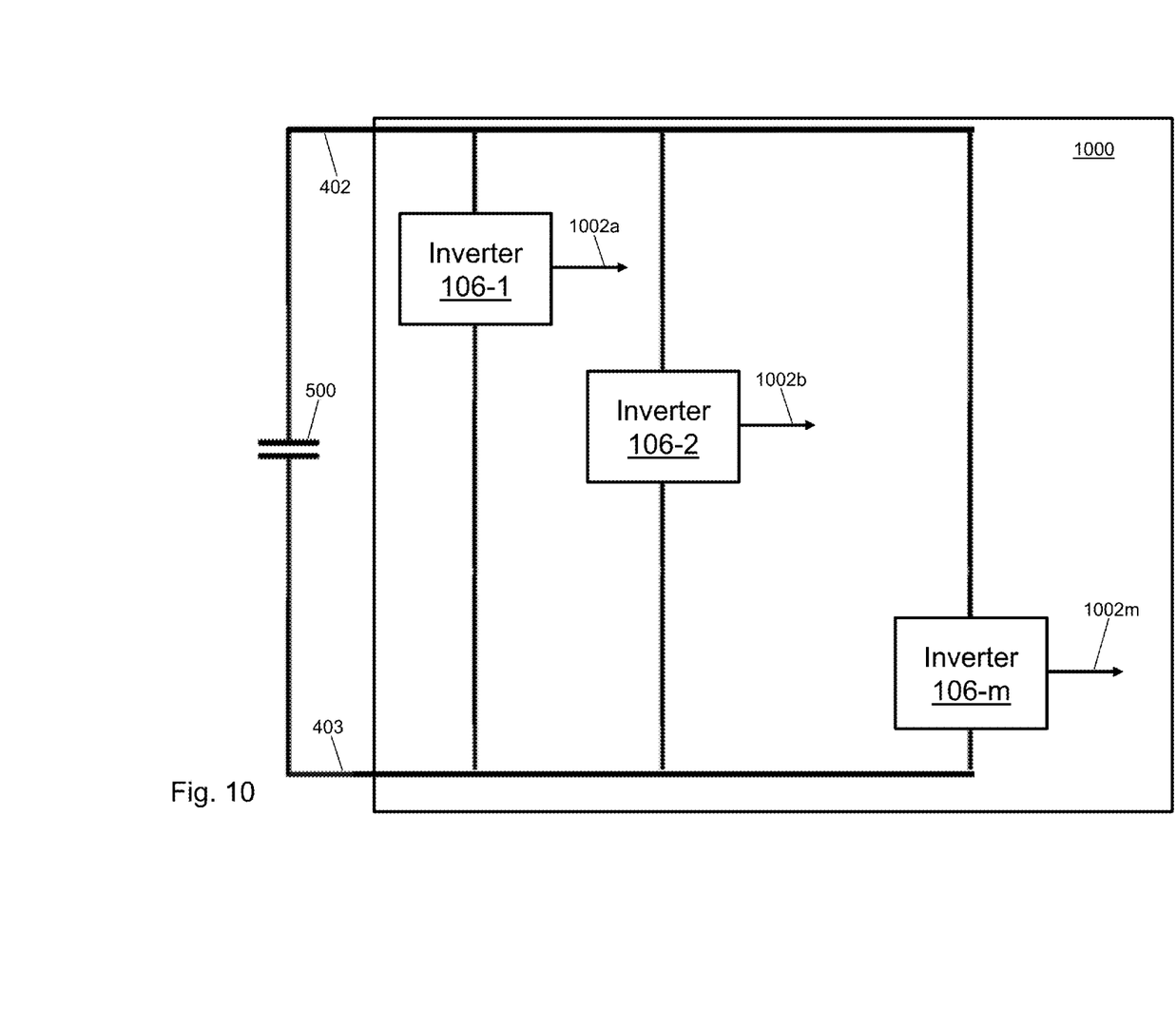
FIG. 10 is a circuit diagram of an inverter of the electric machine system of FIG. 1 in accordance with a fourth illustrative embodiment.

Referring to FIG. 10, a block diagram of a cascaded inverter 1000 is shown in accordance with an illustrative embodiment. Cascaded inverter 1000 and capacitor 500 may be connected across $V_{dc}$ 400 between positive DC line 402 and negative DC line 403 of third inverter 106c, which may be grounded. Cascaded inverter 1000 may include a first inverter 106-1, a second inverter 106-2, . . . , and an mth inverter 106-m. Cascaded inverter 1000 can include any number of m inverters subject to the power requirements of each electric machine 108 to which each inverter of cascaded inverter 1000 is connected. First inverter 106-1, second inverter 106-2, and mth inverter 106-m may be any of first inverter 106a, second inverter 106b, and third inverter 106c.

First inverter 106-1 includes first and second connector lines 1002a, where the number of first and second connector lines 1002a is a function of a number of phases supported by first inverter 106-1 as discussed previously. Second inverter 106-2 includes first and second connector lines 1002b, where the number of first and second connector lines 1002a is a function of a number of phases supported by second inverter 106-2 as discussed previously. mth inverter 106-m includes first and second connector lines 1002m, where the number of first and second connector lines 1002m is a function of a number of phases supported by mth inverter 106-m as discussed previously.

Figure 11A:
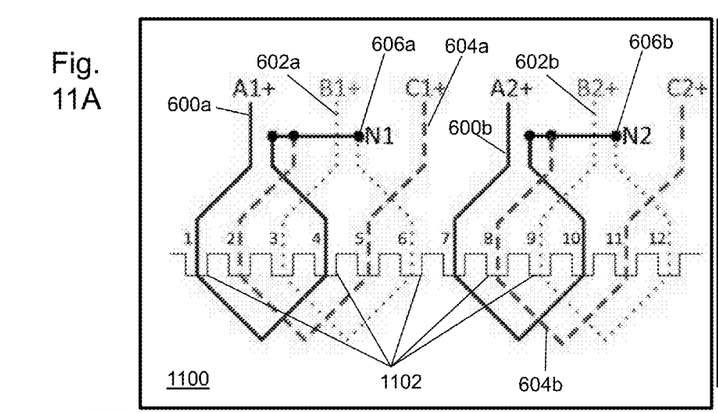
FIGS. 11A and 11B depict a winding configuration of the electric machine of FIG. 1 in accordance with a first illustrative embodiment.
Figure 12A:
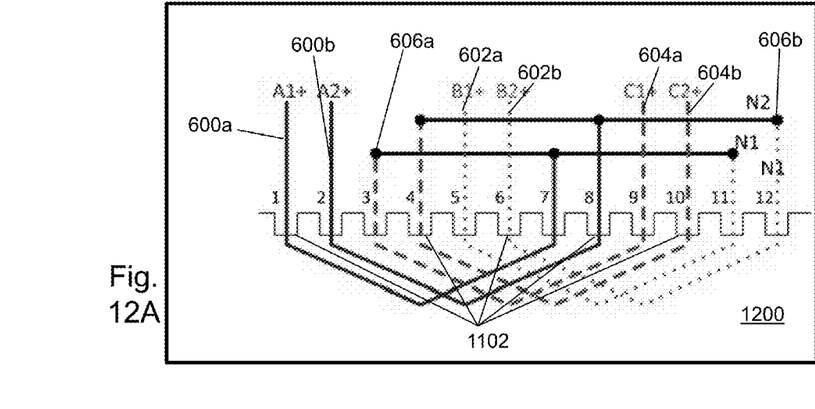
FIGS. 12A and 12B depict a winding configuration of the electric machine of FIG. 1 in accordance with a second illustrative embodiment.

Various winding configurations may be suitable for electric machine 108. Referring to FIGS. 11A and 12A, two winding sets are shown for illustration. Electric machine 108 includes two sets of windings. Machine manufacturers usually connect machine windings in series, but the machine windings of existing machines can be disconnected and reconnected into several winding groups. In an illustrative embodiment, individual machine winding groups have the same gauge, number of turns, and configuration as conventional ones.

Referring to FIG. 11A, a first winding configuration 1100 is shown in accordance with an illustrative embodiment for stator winding 206. First winding configuration 1100 includes first stator winding 600a, second stator winding 602a, third stator winding 604a, fourth stator winding 600b, fifth stator winding 602b, and sixth stator winding 604b with each winding positioned in one of a plurality of slots 1102 of stator 204. First winding configuration 1100 forms a three-phase, four-pole, and twelve slot (1 slot per pole per phase) winding configuration where the three-phase windings forming different poles are separated and have their own neutral points, first common neutral connector 606a and second common neutral connector 606b.

Figure 11B:
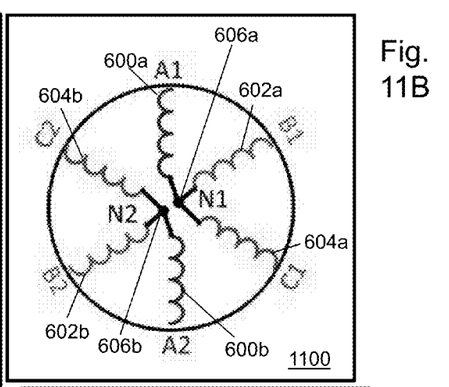

Referring to FIG. 11B, first winding configuration 1100 is shown in accordance with an illustrative embodiment distributed into portions of stator 204. First stator winding 600a and fourth stator winding 600b are equally separated from each other by 180 degrees. Second stator winding 602a and fifth stator winding 602b are equally separated from each other by 180 degrees. Third stator winding 604a and sixth stator winding 604b are equally separated from each other by 180 degrees. Each portion is approximately a 60 degree portion of stator 204.

Referring to FIG. 12A, a second winding configuration 1200 is shown in accordance with an illustrative embodiment for stator winding 206. Second winding configuration 1200 includes first stator winding 600a, second stator winding 602a, third stator winding 604a, fourth stator winding 600b, fifth stator winding 602b, and sixth stator winding 604b with each winding positioned in one of the plurality of slots 1102 of stator 204, but in different slots relative to first winding configuration 1100.

Second winding configuration 1200 forms a three-phase, two-pole, and twelve slot (2 slots per pole per phase) winding configuration where the three-phase windings forming different poles are separated and have their own neutral points, first common neutral connector 606a and second common neutral connector 606b. If electric machine 108 has 2P poles with O slots per phase in each pole, the windings can be split into P·O segments. The windings can also be split into any factor of P·O segments, e.g., if P·O=6, the windings can be split into 1, 2, 3, or 6 segments.

Figure 12B:
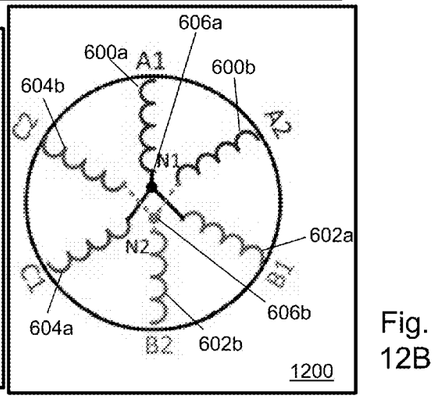

Referring to FIG. 12B, second winding configuration 1200 is shown in accordance with an illustrative embodiment distributed about portions of stator 204. First stator winding 600a and fourth stator winding 600b are equally separated from each other by 60 degrees. Second stator winding 602a and fifth stator winding 602b are equally separated from each other by 60 degrees. Third stator winding 604a and sixth stator winding 604b are equally separated from each other by 60 degrees.

Figure 13:
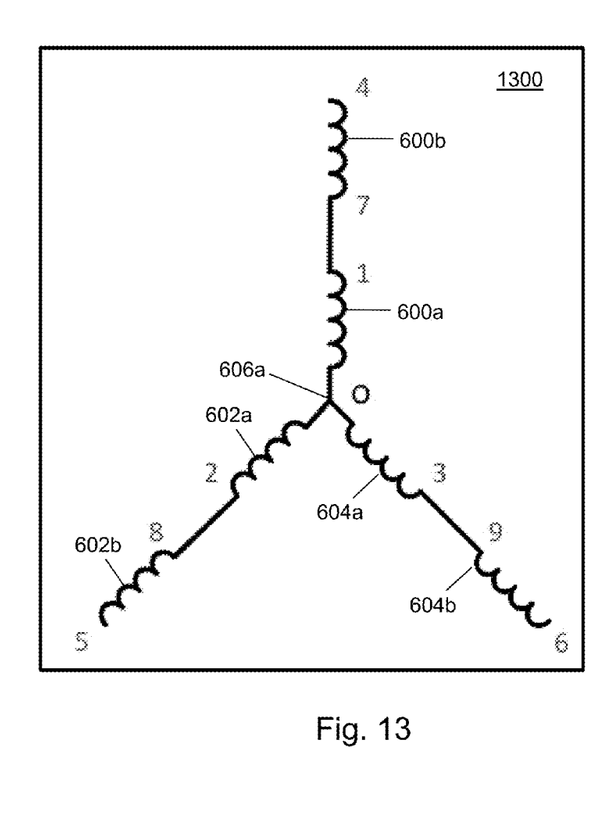
FIG. 13 depicts a general winding configuration of a dual-voltage, 9-lead electric machine in accordance with an illustrative embodiment.

Referring to FIG. 13, a third winding configuration 1300 is shown in accordance with an illustrative embodiment. Third winding configuration 1300 includes first stator winding 600a, second stator winding 602a, third stator winding 604a, fourth stator winding 600b, fifth stator winding 602b, and sixth stator winding 604b arranged to form a dual-voltage 9-lead electric machine.

Figure 14:
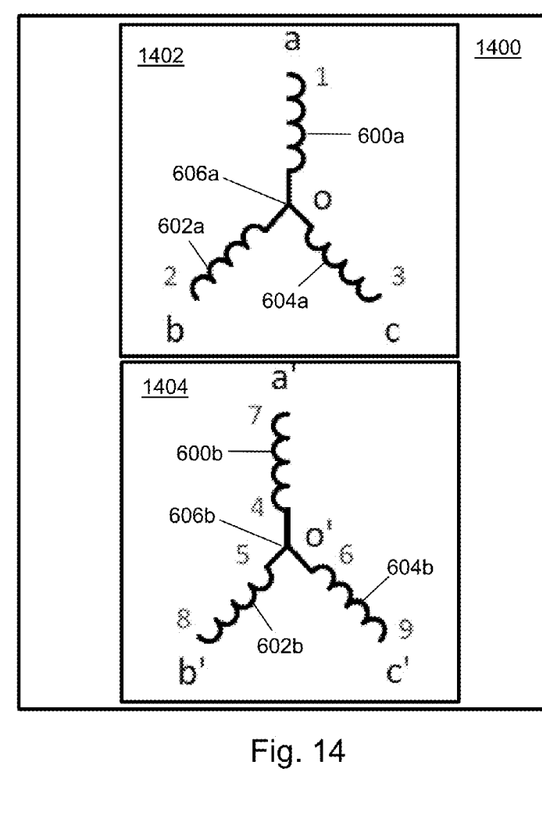
FIG. 14 depicts a winding configuration of the electric machine of FIG. 1 created by disconnecting and reconnecting the general winding configuration of FIG. 13.

Referring to FIG. 14, a fourth winding configuration 1400 is shown in accordance with an illustrative embodiment for stator winding 206 in which third winding configuration 1300 has been disconnected and reconnected to form a first winding set 1402 and a second winding set 1404. First winding set 1402 includes first stator winding 600a, second stator winding 602a, and third stator winding 604a. Second winding set 1404 includes fourth stator winding 600b, fifth stator winding 602b, and sixth stator winding 604b.

Because the described inverter circuits cancel the CM voltage, no CM electromagnetic interference filters are needed, resulting in an increased power density (6-25%), an increased system efficiency, and a reduced product cost. The ground leakage currents are further eliminated resulting in no interference with the control, gating, and protection circuits, which leads to increased system reliability. Use of the described inverter circuits further results in a prolonged motor life with reduced maintenance costs. Existing control algorithm, modulation, and sensing technologies are directly applicable to the new topology.

As used in this disclosure, the term "connect" includes join, unite, mount, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "connected on" and "connected to" include any interior or exterior portion of the element referenced.

Elements referenced as connected to each other herein may further be integrally formed together. As a result, elements described herein as being connected to each other need not be discrete structural elements. The elements may be connected permanently, removably, or releasably.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. An inverter comprising:
a positive direct current (DC) line;
a negative DC line; and
a plurality of inverter legs, wherein each inverter leg comprises
a first switch;
a first switch control line connected to the first switch and configured to receive a first control signal to control an on or off state of the first switch;
a second switch;
a second switch control line connected to the second switch and configured to receive a second control signal to control an on or off state of the second switch;
a third switch;
a third switch control line connected to the third switch and configured to receive the first control signal to control an on or off state of the third switch;
a first connector line connected between the first switch and the second switch; and
a second connector line connected between the second switch and the third switch;
wherein the first switch, the second switch, and the third switch are connected sequentially in series between the positive DC line and the negative DC line;
wherein the first connector line is configured to be connected to a first winding of an electric machine;
wherein the second connector line is configured to be connected to a second winding of the electric machine;
wherein the second control signal is complementary to the first control signal.

2. The inverter of claim 1, wherein the plurality of inverter legs comprise a first inverter leg and a second inverter leg, wherein the first connector line of the first inverter leg and the first connector line of the second inverter leg are configured to be connected to opposite ends of the first winding of the electric machine.

3. The inverter of claim 2, wherein the second connector line of the first inverter leg and the second connector line of the second inverter leg are configured to be connected to opposite ends of the second winding of the electric machine.

4. The inverter of claim 1, wherein the second switch is rated to support a maximum DC voltage, wherein the first switch and the third switch are rated to support half the maximum DC voltage.

5. The inverter of claim 1, wherein the plurality of inverter legs comprise a first inverter leg, a second inverter leg, and a third inverter leg, wherein the first connector line of the first inverter leg, the first connector line of the second inverter leg, and the first connector line of the third inverter leg are configured to be connected to respective ends of a first set of windings of the electric machine, wherein opposite ends of the first set of windings are connected to a common neutral connector to form a three-phase wye connection configuration.

6. The inverter of claim 5, wherein the second connector line of the first inverter leg, the second connector line of the second inverter leg, and the second connector line of the third inverter leg are configured to be connected to respective ends of a second set of windings of the electric machine, wherein opposite ends of the second set of windings are connected to a second common neutral connector to form a second three-phase wye connection configuration.

7. An electric machine drive comprising:
a controller comprising
 a first control signal line; and
 a second control signal line, wherein the controller is configured to generate a first control signal on the first control signal line and to generate a second control signal on the second control signal line, wherein the first control signal is complementary to the second control signal; and
a positive direct current (DC) line;
a negative DC line; and
an inverter comprising a plurality of inverter legs, wherein each inverter leg comprises
 a first switch;
 a first switch control line connecting the first control signal line to the first switch to receive the first control signal;
 a second switch;
 a second switch control line connecting the second control signal line to the second switch to receive the second control signal;
 a third switch;
 a third switch control line connecting the first control signal line to the third switch to receive the first control signal;
 a first connector line connected between the first switch and the second switch; and
 a second connector line connected between the second switch and the third switch;
 wherein the first switch, the second switch, and the third switch are connected sequentially in series between the positive DC line and the negative DC line;
 wherein the first connector line is configured to be connected to a first winding of an electric machine;
 wherein the second connector line is configured to be connected to a second winding of the electric machine;
 wherein the first control signal controls an on or off state of the first switch and the third switch together;
 wherein the second control signal controls an on or off state of the second switch.

8. The electric machine drive of claim 7, wherein the plurality of inverter legs comprises a first inverter leg and a second inverter leg, wherein the first connector line of the first inverter leg and the first connector line of the second inverter leg are configured to be connected to opposite ends of the first winding of the electric machine.

9. The electric machine drive of claim 8, wherein the second connector line of the first inverter leg and the second connector line of the second inverter leg are configured to be connected to opposite ends of the second winding of the electric machine.

10. The electric machine drive of claim 7, wherein the second switch is rated to support a maximum DC voltage, wherein the first switch and the third switch are rated to support half the maximum DC voltage.

11. The electric machine drive of claim 7, further comprising a second inverter comprising:
a second plurality of inverter legs, wherein each inverter leg of the second plurality of inverter legs comprises
 a fourth switch;
 a fourth switch control line connecting a third control signal line to the fourth switch to receive a third control signal;
 a fifth switch;
 a fifth switch control line connecting a fourth control signal line to the fifth switch to receive a fourth control signal;
 a sixth switch;
 a sixth switch control line connecting the third control signal line to the sixth switch to receive the third control signal;
 a third connector line connected between the fourth switch and the fifth switch; and
 a fourth connector line connected between the fifth switch and the sixth switch;
 wherein the fourth switch, the fifth switch, and the sixth switch are connected sequentially in series between the positive DC line and the negative DC line;
 wherein the third connector line is configured to be connected to a third winding of the electric machine;
 wherein the fourth connector line is configured to be connected to a fourth winding of the electric machine;
 wherein the third control signal controls an on or off state of the fourth switch and the sixth switch together;
 wherein the fourth control signal controls an on or off state of the fifth switch;
wherein the controller further comprises
 the third control signal line; and
 the fourth control signal line,
wherein the controller is configured to generate the third control signal on the third control signal line and to generate the fourth control signal on the fourth control signal line, wherein the fourth control signal is complementary to the third control signal.

12. An electric machine system comprising:
a controller comprising
 a first control signal line; and
 a second control signal line, wherein the controller is configured to generate a first control signal on the first control signal line and to generate a second control signal on the second control signal line, wherein the first control signal is complementary to the second control signal;
a positive direct current (DC) line;
a negative DC line;
an inverter comprising a plurality of inverter legs, wherein each inverter leg comprises
a first switch;
a first switch control line connecting the first control signal line to the first switch to receive the first control signal;
a second switch;
a second switch control line connecting the second control signal line to the second switch to receive the second control signal;
a third switch;
a third switch control line connecting the first control signal line to the third switch to receive the first control signal;
a first connector line connected between the first switch and the second switch; and
a second connector line connected between the second switch and the third switch;
wherein the first switch, the second switch, and the third switch are connected sequentially in series between the positive DC line and the negative DC line;
wherein the first control signal controls an on or off state of the first switch the third switch together;
wherein the second control signal controls an on or off state of the second switch; and
an electric machine comprising
a stator;
a rotor configured to rotate relative to the stator;
a first winding wound around at least a first portion of the stator; and
a second winding wound around at least a second portion of the stator;
wherein the first connector line is configured to be connected to the first winding;
wherein the second connector line is configured to be connected to the second winding.

13. The electric machine system of claim 12, wherein the plurality of inverter legs comprises a first inverter leg and a second inverter leg, wherein the first connector line of the first inverter leg and the first connector line of the second inverter leg are configured to be connected to opposite ends of the first winding.

14. The electric machine system of claim 13, wherein the second connector line of the first inverter leg and the second connector line of the second inverter leg are configured to be connected to opposite ends of the second winding.

15. The electric machine system of claim 12, wherein the second switch is rated to support a maximum DC voltage, wherein the first switch and the third switch are rated to support half the maximum DC voltage.

16. The electric machine system of claim 12, wherein the electric machine further comprises:
a third winding wound around at least a third portion of the stator;
a fourth winding wound around at least a fourth portion of the stator;
a fifth winding wound around at least a fifth portion of the stator;
a sixth winding wound around at least a sixth portion of the stator;
wherein the first winding, the third winding, and the fifth winding are connected at a first end to a first common neutral connector,
wherein the second winding, the fourth winding, and the sixth winding are connected at a first end to a second common neutral connector,
wherein the plurality of inverter legs comprises a first inverter leg, a second inverter leg, and a third inverter leg;
wherein the first connector line of the first inverter leg is connected to a second end of the first winding opposite the first end;
wherein the first connector line of the second inverter leg is connected to a second end of the third winding opposite the first end;
wherein the first connector line of the third inverter leg is connected to a second end of the fifth winding opposite the first end;
wherein the second connector line of the first inverter leg is connected to a second end of the second winding opposite the first end;
wherein the second connector line of the second inverter leg is connected to a second end of the fourth winding opposite the first end;
wherein the second connector line of the third inverter leg is connected to a second end of the sixth winding opposite the first end.

17. The electric machine system of claim 16, wherein the first, third, and fifth portions of the stator are equally separated from the second, fourth, and sixth portions of the stator, respectively.

18. The electric machine system of claim 16, wherein the first, third, and fifth portions of the stator are respectively separated from the second, fourth, and sixth portions of the stator by 180 degrees.

19. The electric machine system of claim 16, wherein the electric machine further comprises:
a seventh winding wound around at least a seventh portion of the stator;
an eighth winding wound around at least a eighth portion of the stator;
wherein the seventh winding is further connected at a first end to the first common neutral connector,
wherein the eighth winding is further connected at a first end to the second common neutral connector,
wherein the plurality of inverter legs further comprises a fourth inverter leg;
wherein the first connector line of the fourth inverter leg is connected to a second end of the seventh winding opposite the first end;
wherein the second connector line of the fourth inverter leg is connected to a second end of the eighth winding opposite the first end.

20. The electric machine system of claim 12, wherein, when the electric machine is operated, a first current flowing through the first winding is 180 degrees out of phase relative to a second current flowing through the second winding.

* * * * *